(12) United States Patent
Boulet D'Auria et al.

(10) Patent No.: US 11,226,061 B2
(45) Date of Patent: Jan. 18, 2022

(54) DEVICE FOR FACILITATING PIPELINE REPAIR

(71) Applicant: 3X Engineering, Monaco (MC)

(72) Inventors: Stanislas Boulet D'Auria, Villefranche sur Mer (FR); Hacen Slimani, Nice (FR)

(73) Assignee: 3X Engineering, Monaco (MC)

( * ) Notice: Subject to any disclaimer, the term of this patent is extended or adjusted under 35 U.S.C. 154(b) by 162 days.

(21) Appl. No.: 16/646,933

(22) PCT Filed: Sep. 23, 2018

(86) PCT No.: PCT/EP2018/075715
§ 371 (c)(1),
(2) Date: Mar. 12, 2020

(87) PCT Pub. No.: WO2019/057949
PCT Pub. Date: Mar. 28, 2019

(65) Prior Publication Data
US 2020/0278068 A1 Sep. 3, 2020

(30) Foreign Application Priority Data
Sep. 24, 2017 (FR) ...................................... 1771010

(51) Int. Cl.
*F16L 55/18* (2006.01)
*B29C 63/02* (2006.01)
(Continued)

(52) U.S. Cl.
CPC ............ *F16L 55/18* (2013.01); *B29C 63/024* (2013.01); *B29C 63/10* (2013.01); *F16L 1/26* (2013.01);
(Continued)

(58) Field of Classification Search
CPC ..... B29C 63/024; B29C 63/10; B29C 63/105; B29C 63/06; B29C 63/065; B29C 53/58;
(Continued)

(56) References Cited

U.S. PATENT DOCUMENTS 3,616,063 A * 10/1971 Bradley .............. B29C 53/8008
156/425
4,125,422 A * 11/1978 Stuart, Jr ............... B65H 81/08
156/392
(Continued)

FOREIGN PATENT DOCUMENTS

FR          2640243 A1    6/1990
WO  WO-2012010828 A1 *  1/2012 ............. B29C 70/30
WO     2013/182831 A1   12/2013

*Primary Examiner* — Philip C Tucker
*Assistant Examiner* — Brian R Slawski
(74) *Attorney, Agent, or Firm* — James C. Lydon

(57) ABSTRACT

A device for winding a reinforcing strip onto a repair length on either side of a portion to be repaired of a pipe, including: a carriage bearing a reel holder and a reel, means for rotating the carriage around the pipe and for translating same along the longitudinal axis of the pipe so that the strip is wound around the pipe in the form of a helix, means for reversing the direction of translation movement of the carriage so that, at each change of direction, the carriage moves in a direction opposite to the previous one and a layer of reinforcing strip is wound around the pipe, overlapping the previous layer. The means for translating the carriage include a conveying chain and the reversing means are actuated automatically without the intervention of an operator.

18 Claims, 3 Drawing Sheets

(51) Int. Cl.
  *B29C 63/10* (2006.01)
  *F16L 1/26* (2006.01)
  *F16L 55/168* (2006.01)
  *B29C 53/70* (2006.01)
  *B29C 65/00* (2006.01)
  *B29C 63/06* (2006.01)

(52) U.S. Cl.
  CPC .......... *F16L 55/1686* (2013.01); *B29C 53/70* (2013.01); *B29C 63/065* (2013.01); *B29C 66/84* (2013.01)

(58) Field of Classification Search
  CPC .......... B29C 53/70; B29C 66/84; F16L 55/18; F16L 55/1686; F16L 1/26; F16L 58/1063; B65H 81/06; B65H 81/08
  USPC ..... 156/60, 71, 94, 184, 185, 187, 195, 349, 156/391, 392, 425, 428, 443, 475, 486, 156/538, 574, 577; 138/97, 98, 99; 405/184.1; 118/305, 307
  See application file for complete search history.

(56) References Cited

U.S. PATENT DOCUMENTS

| | | | | |
|---|---|---|---|---|
| 4,145,740 | A | * | 3/1979 | McClean .......... G05B 19/4142 700/126 |
| 4,322,262 | A | * | 3/1982 | Cottam .................. B65H 81/08 156/392 |
| 4,838,971 | A | * | 6/1989 | Cacak .................. B29C 35/0272 156/173 |
| 5,491,880 | A | * | 2/1996 | Labiche .................. B29C 63/10 156/282 |
| 5,589,019 | A | * | 12/1996 | Van Beersel .......... B29C 63/14 156/184 |
| 5,988,224 | A | | 11/1999 | Boulet D'Auria |
| 6,334,465 | B2 | | 1/2002 | Boulet D'Auria |
| 7,128,925 | B2 | | 10/2006 | Boulet D'Auria |
| 7,370,676 | B2 | | 5/2008 | Boulet D'Auria et al. |
| 7,635,007 | B2 | | 12/2009 | Boulet D'Auria et al. |
| 8,978,709 | B2 | | 3/2015 | Boulet D'Auria |
| 9,631,764 | B2 | | 4/2017 | Slimani et al. |
| 9,702,497 | B2 | | 7/2017 | Boulet D'Auria et al. |
| 2018/0003255 | A1 | | 1/2018 | Boulet D'Auria |

\* cited by examiner

DEVICE FOR FACILITATING PIPELINE REPAIR

TECHNICAL FIELD

The present invention relates to the repair of pipelines and pipes intended for transporting fluids or gas under pressure and relates in particular to a device for facilitating the repair of pipelines.

BACKGROUND ART

Pipelines or pipes that transport gas or liquid under pressure over long distances are subject to damage such as impacts or internal and external corrosion. It often arises that the pipe is damaged to such an extent that its contents leak. Repair solutions have been developed to stop these local leaks. For example, by winding a reinforcing strip around the pipe at the location of the leak. To be effective, this strip is wound in a helix around the pipe, overlapping a length of pipe broadly encompassing the location of the leak, and several layers of strips are superimposed on each other.

An apparatus for winding a strip around a pipeline is known from document WO2011049668. It describes an apparatus comprising a winding head, feeding a strip of material through the winding head, attaching an end of the strip of material to the existing pipe. The strip is wound in a helix around the pipe by rotating the winding head and axially translating the winding head relative to the pipe. To make an additional pass, the winding device is returned to the starting position on the pipe and the second pass is applied in a similar manner to the first. This device has the disadvantage of returning the winding head to the starting position, which results in the winding of the strip around the pipe not being continuous.

Document WO2013/182831 describes a device for winding a polymerizable pre-impregnated strip around a pipe area to be repaired. A reel holder is actuated in rotation around the pipe in order to wind the prepreg strip around the area to be repaired. Once the first pass is made, the reel holder is actuated in rotation and in translation in the opposite direction, which allows the strip to be wound up evenly and with a regular winding pitch in a second pass over the first. The carriage is driven in translation in the longitudinal direction of the pipe under the action of a screw driven by the rotational movement of the device and by a gear system. The change of direction of the carriage is made by changing the direction of rotation of the screw. This change of direction of rotation of the screw is carried out by the operator who actuates a gearbox which reverses a sprocket. The disadvantage of such a device lies in the fact that the reversal of direction is manual. In addition, the rotation of the device must be stopped when the direction is reversed. Furthermore, it sometimes happens that the reel holder gets stuck at the end of the screw. Indeed, when the repair operation is carried out underwater, visibility is not good and the divers, not seeing that the reel holder is reaching the end of the stroke, do not slow down the movement, and the force applied jams the reel holder at the end of the threads. Thereafter, this requires an operator intervention and, in the case of an underwater repair, an additional effort from the divers to unblock the reel holder.

SUMMARY OF THE INVENTION

This is why the object of the invention is to provide a device for winding a composite strip around a pipe which comprises means for the reel holder to automatically change direction without the operator intervening to produce this change of direction and without the actuation of the device around the pipe being stopped.

The object of the invention is thus a winding device for winding a reinforcing strip onto a repair length on either side of a portion of a pipe to be repaired, comprising:
  a carriage rigidly connected to a reel holder,
  a reel of reinforcing strip wound onto the reel holder,
  means for rotating the carriage about the circumference of the pipe and means for translating same along the longitudinal axis of the pipe so that the strip is wound around said pipe in the form of a helix,
  means for reversing the direction of translation movement of the carriage so that, at each change of direction, the carriage moves in a direction opposite to the previous one and a layer of reinforcing strip is wound around the pipe, overlapping the previous layer.

According to a main characteristic of the invention, the means for translating further comprise a conveyor chain comprising two strands moving between a first sprocket and a second sprocket in opposite directions and comprise mobile means for attachment of the carriage to the chain adapted to cooperate with the strands of the chain. According to another main characteristic of the invention, the reversing means move the mobile attachment means of the carriage from one strand to the other one and vice versa so that when one of the mobile attachment means becomes detached from one strand, the other mobile attachment means cooperates with the other strand, the reversing means thus being actuated automatically during the rotation of the carriage around the pipe.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
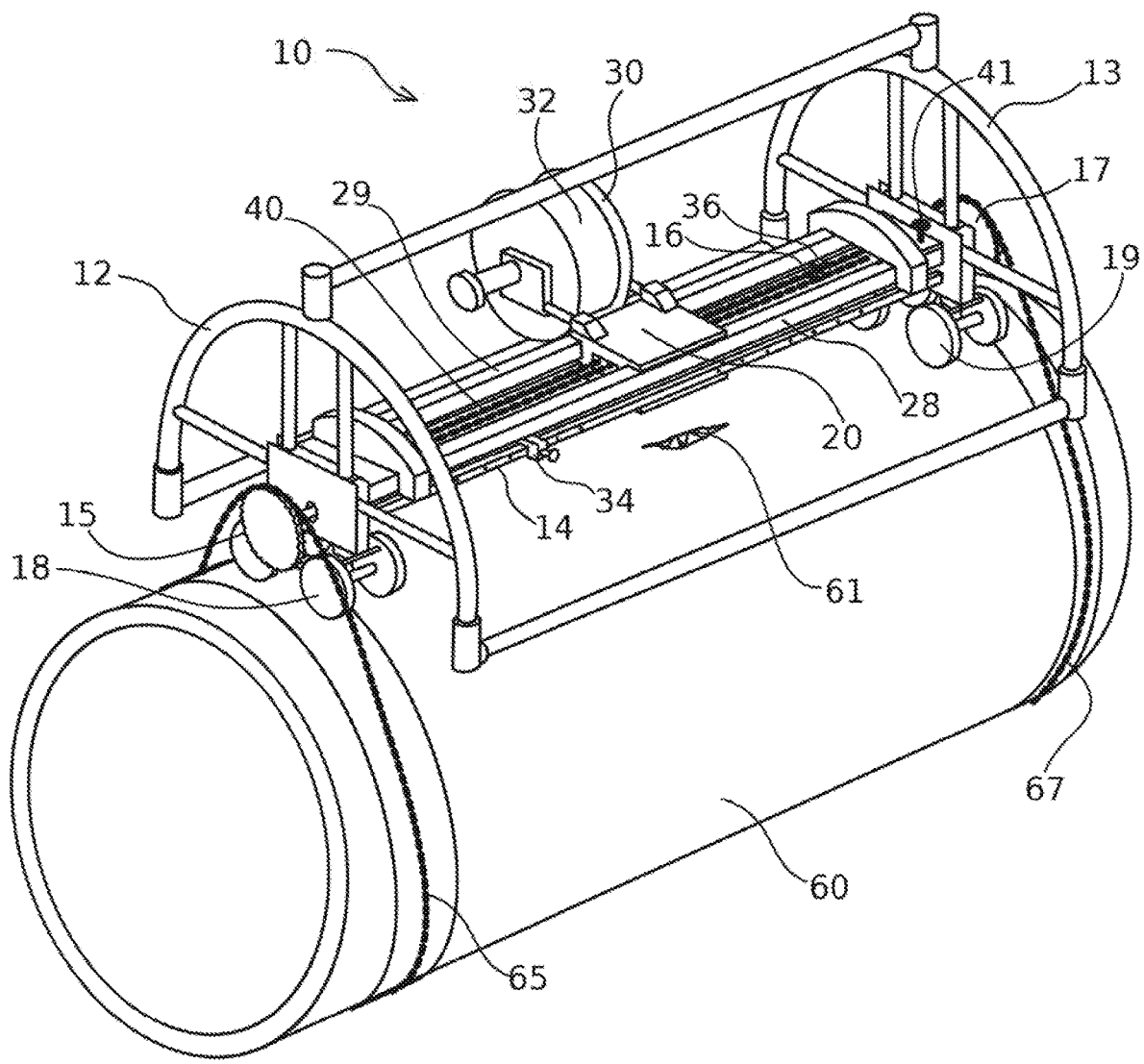
FIG. 1 represents the device according to the invention according to the preferred embodiment of the invention.

According to FIG. 1, the device which makes the subject of the invention is represented globally on a pipe to be repaired 60. According to the preferred embodiment of the invention, the pipe 60 is an underwater pipe of the pipeline type containing a pressurized fluid. The pipe to be repaired can also be a ground pipe or a tube such as a boat mast or a vertical column. The portion of the pipe to be repaired 61 can be a crack, a hole caused by internal or external corrosion, a dent or an impact. All these causes lead to weakening of the pipe, or even a leak of the liquid it contains towards the outside. The device 10 is placed and removably fixed on the pipe 60 so as to be centered on the portion to be repaired 61. The length of the device 10 along the longitudinal axis of the pipe defines the maximum length of the repair zone on which the reinforcing strip will be applied. At each of its ends, the device 10 comprises sprockets 15 and 17, each engaged in a chain 65 and 67, the two chains being closed around the outer circumference of the pipe, placed on either side of the portion of pipe to be repaired and separated by a distance equal to the length of the device. The chains 65 and 67 allow the device 10 to be positioned against the external wall of the pipe and to rotate around the circumference of the pipe 60. When the device is set in motion around the pipe, it moves against its external wall thanks to two sets of wheels 18 and 19 located on each side and at each end of the device. The rotational movement is controlled either by an operator who actuates one of the two half-flywheels 12 or 13 each located at the two ends of the device or by two operators who each actuate on one side and simultaneously the two half-flywheels 12 and 13. The rotational movement of the device around the pipe can also be produced by a motor not shown in the figure.

The device 10 comprises a mobile reel holder 30 on which a reinforcing strip 32 is wound. The reinforcing strip is a pre-impregnated polymerizable strip. Any other type of strip can be used without departing from the scope of the invention. The reel holder 30 comprises means for adjustably tensioning the strip on the pipe as the winding progresses. The reel holder 30 is rigidly connected to a carriage 20 which can slide in both directions along guide means such as at least one guide rail and preferably two guide rails 28 and 29 having a square cross section. The guide rails 28 and 29 are parallel to the longitudinal axis of the pipe. The longitudinal axis of the pipe is defined for the remainder of the description as an axis parallel to the main local axis of the pipe at the location of the portion to be repaired. The carriage is limited in its movement along the guide rails by two stops 34 and 36 each located on two positioning tubes 14 and 16, respectively. The rotation of the device 10 around the pipe automatically causes the carriage 20 to rotate around the pipe and the reinforcing strip 32 held by the reel holder 30 is unwound, and then wound with tension around the pipe 60. The half-flywheels 12 and 13, the sprockets 15 and 17 and the chains 65 and 67 represent the means for rotating the carriage around the pipe.

The device 10 also comprises means for translating the reel holder carriage along the longitudinal axis of the pipe along the guide rails. The means for translating the carriage described in detail with reference to FIGS. 2 and 3 further comprise a conveyor chain 40 and are connected to at least one of the two sprockets 15 or 17 by a gear system not shown in the figures. Thus, at each revolution of the device around the pipe, the carriage advances along the guide rails with a regular pitch so that the strip is wound in a helix around the pipe. However, the means for translating the carriage can be disengaged from the sprockets 15 or 17 by means of a clutch 41. The sprockets 15 and 17 are preferably sized so that, when the device 10 makes one revolution around the pipe, the reel holder carriage advances along the rails with a pitch of a length equal to half the width of the reinforcing strip. In this way, the reinforcing strip is wound around the pipe in a helix and with an overlap. When the means for translating the carriage are disengaged, one revolution of the device around the pipe drives the reel holder in rotation only. Thus, the reinforcing strip is unwound and applied around the pipe without forming a helix and so as to return to its starting point and be superimposed on itself. This way of positioning the strip is called a dead turn and is useful at the start of positioning the strip and possibly at the end.

As long as the carriage moves along its guide rails in a first direction, the strip is unwound according to a pass. In the following description, each pass is defined as corresponding to a layer of strips. According to the preferred embodiment described above, the strip is wound around the pipe in the form of a helix with an overlap equal to half a strip width, thus each layer comprises two strip thicknesses. In another embodiment, the strip is wound in a helix without overlapping, thus edge to edge, therefore in this case each layer would correspond to one strip thickness. In order for a second layer of strip to be applied on top of the first one, the reel holder carriage must be translated along its guide rails in the direction opposite to the first one. Likewise, the third layer is applied when the carriage of the reel holder arriving at the end of the stoke changes direction and moves in translation in the first direction and so on. Generally, for repairs on a pipe transporting a fluid under pressure, each layer covers a length of pipe that is less than the overlapping length of the previous layer, and preferably a length equal to half the layer.

The device according to the invention allows for the layering of several required layers of reinforcing strip while it is actuated around the pipe in one and the same direction of rotation throughout the duration of the repair operation in a continuous movement, the change of direction at the end of each layer being performed automatically and without any intervention of the operator. The details of this essential characteristic of the device as well as the means for driving the carriage are described with reference to the following figures.

Figure 2:
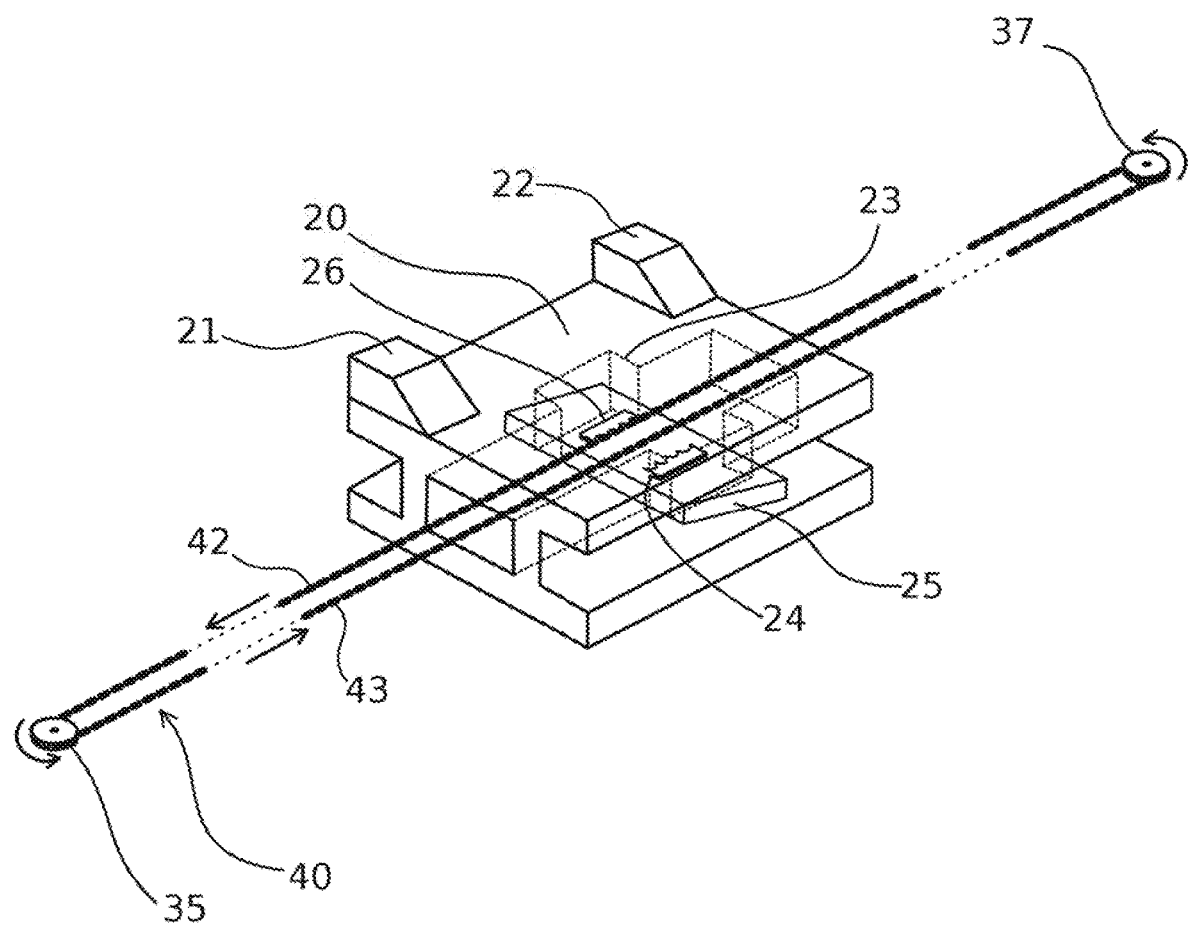
FIG. 2 represents a perspective view of the reel holder carriage according to the invention.

According to FIG. 2, the carriage 20 is shown without the reel holder fixed by means of two parts 21 and 22 and comprises a cavity 23 shown in dotted lines in the figure and in which a mobile part 25 slides. A portion of the cavity 23 also allows the passage of the conveyor chain 40. The conveyor chain 40 is a mobile endless chain comprising a first strand 42 and a second strand 43 moving between a first sprocket 35 and a second sprocket 37 in opposite directions. In a preferred embodiment of the invention, the conveyor chain 40 is of the roller chain type, preferably made of stainless steel. The conveyor chain 40 can also refer to a chain of another type or an endless belt without departing from the scope of the invention. For the following description, the conveyor chain 40 will simply be called chain 40. When the means for translating the carriage are disengaged, the means for rotating same, which are sprockets 35 and 37, no longer rotate.

The mobile part 25 is sliding in translation in the cavity 23 in a direction preferably perpendicular to the chain 40 between two stable positions described in detail with reference to FIGS. 3 and 4. The mobile part 25 comprises two gears 24 and 26 each capable of cooperating with the strands 42 and 43 of the chain, respectively. The first gear 26 is adapted to cooperate with the first strand 42 while the second gear 24 is adapted to cooperate with the second strand 43. When the mobile part 25 is in one of the two stable positions, at least one of the 2 gears cooperates with one of the strands of the chain so that, if the chain is in motion, the carriage is driven and moves in the direction of the strand on which the mobile part is attached. The means for translating the carriage 20 therefore comprise mobile means for attaching the carriage to the chain 40, which are the gears 24 and 26 fixed to the mobile part 25.

Figure 3:
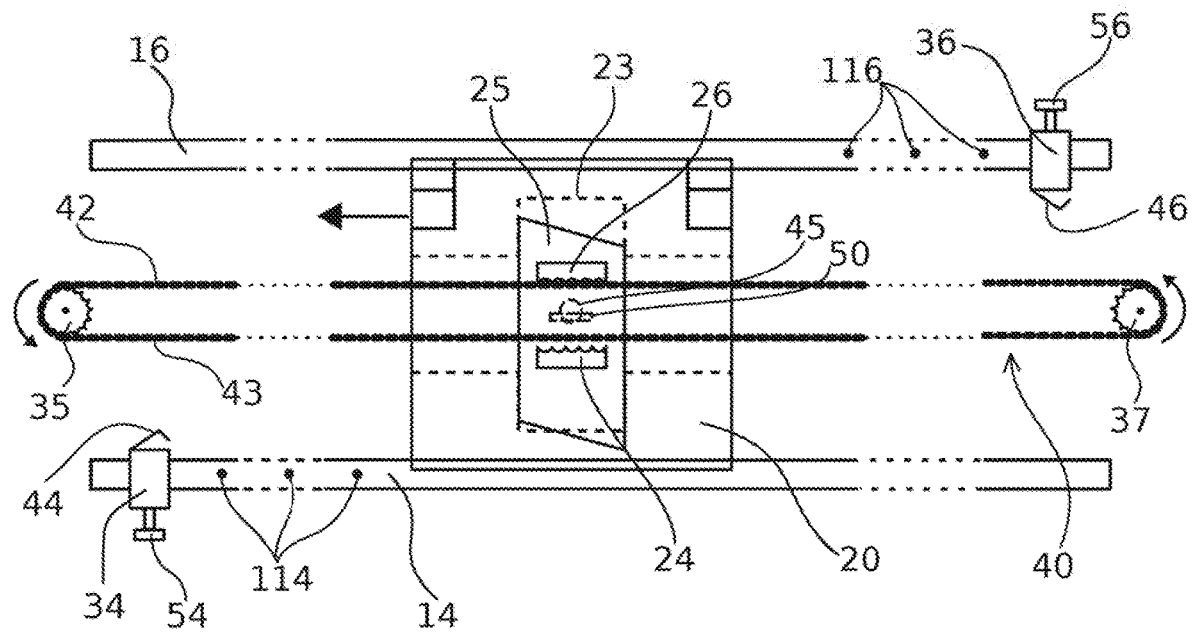
FIG. 3 represents a top view and the details of the drive means of the reel holder moving in a first direction.
Figure 4:
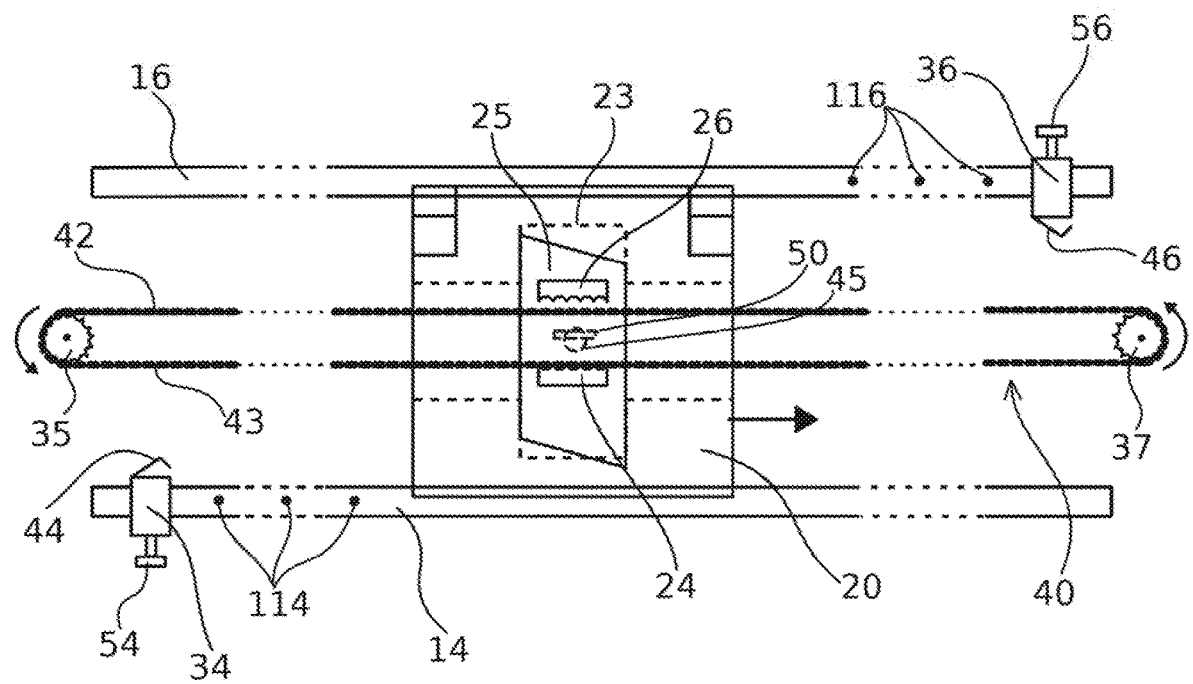
FIG. 4 represents a top view and the details of the drive means of the reel holder moving in a second direction.

FIGS. 3 and 4 represent the carriage 20 driven in displacement by the chain 40 in a longitudinal direction along the pipe, respectively, from right to left in FIG. 3, and in the opposite direction in FIG. 4. With reference to these figures, the means for reversing the direction of the translation movement of the carriage are described. The carriage 20 moves along the two guide rails not shown in FIGS. 3 and 4 and parallel to a first positioning tube 14 and to a second positioning tube 16. The two positioning tubes are parallel to the two strands of the chain and are also parallel to the guide rails and to the longitudinal axis of the pipe. The sprockets 35 and 37 which drive the chain 40 always rotate in the same direction. The positioning tubes 14 and 16 are fitted with a stop 34 and 36, respectively. The stops 34 and 36 are fixed but can slide along their respective tube and their position is locked on the tube at the location of predefined holes 114 in the tube 14 and 116 in the tube 16, the holes being separated by a constant distance preferably equal to 25 mm. To this end, the stops 34 and 36 are each provided with an indexing finger 54 and 56, respectively, mounted on a spring which, when pulled by an operator, authorizes its movement along the respective positioning tube 14 or 16 and, when released and positioned in front of a hole 114 or 116, blocks the stop on the tube 14 or 16. The mobile part 25 is constrained by the side walls of the cavity 23 and can move in translation between two stable positions illustrated in FIGS. 3 and 4, respectively. The two stable positions of the part 25 are maintained by the attraction of a magnet 45 rigidly connected to the part 25 and a magnet 50 rigidly connected to the carriage 20 but not rigidly connected to the part 25. The magnet 45 is movable relative to the magnet 50, called the fixed magnet in the following description. The fixed magnet 50 is located on the carriage 20 so as to be equidistant from the strands 42 and 43 of the chain 40 and opposite the mobile part 25. The fixed magnet 50 is for example radially magnetized so that the mobile magnet 45 is attracted to the edges of the fixed magnet 50 and repelled by its center. In FIG. 3, the mobile part is held thanks to the magnets 45 and 50 in a first stable position so that the gear 26 cooperates with the strand 42 of the chain 40. The mobile part is therefore driven by the chain 40 and drives the carriage 20 in a first direction, from right to left in the figure. While, in FIG. 4, the mobile part is held, thanks to the magnets 45 and 50, in the second stable position so that, in this position, the gear 24 cooperates with the strand 43 of the chain 40. The mobile part is therefore driven by the chain 40 and drives the carriage 20 in the direction opposite to the first one, from left to right in the figure. The mobile part 25 is sized and positioned so that, when the carriage 20 moves along its guide rail in the direction of the stop 34, the mobile part 25 comes into contact with the stop 34 and, conversely, when the carriage 20 moves along its guide rail in the direction of the stop 36, the mobile part 25 comes into contact with the stop 36. When the carriage moves in the first direction, it goes from the stop 36 to the stop 34. As soon as the mobile part comes into contact with the stop 34, it is pushed and slides in the cavity 23 so that the first gear 26 moves away from the first strand 42 of the chain 40 and dissociates from it while the second gear 24 approaches the second strand 43 of the chain 40 until it cooperates with it. This amounts to saying that when one of the mobile attachment means 24 or 26 is detached from one strand, the other mobile attachment means 24 or 26 cooperates with the other strand. Conversely, when the carriage 20 moves along its guide rail in the direction of the stop 36, the mobile part comes into contact with the stop 36, it is pushed by it and slides in the cavity 23 so that the gear 24 moves away from the strand 43 of the chain and dissociates from it while the gear 26 approaches the strand 42 of the chain until it cooperates with it. The mobile part 25 goes from one stable position to the other when it comes into contact with the stops 34 and 36. To this end, and so that the movement of the chain 40 is not slowed down at the time of contact, the stops 34 and 36 are equipped respectively with an elastic blade 44 and 46 so that, when they come into contact with one another, the effort between the two gradually increases. In addition, this effect is reinforced by the shape and sizing of the mobile part 25. For this, the face of the mobile part which comes into contact with the blade has a slope on which the stop comes into contact. The stops 34 and 36 provided with their blades 44 and 46, respectively, allow the direction of the translation movement of the carriage to be reversed by moving the mobile means for attaching the carriage from one strand 42 to the other strand 43 of the chain and conversely. Thanks to the device according to the invention, the means for reversing the direction of the translation movement of the carriage are actuated automatically during the rotation of the carriage around said pipe without any intervention of the operator.

The operation of the device according to the invention will now be described. Once the device 10 is placed around the pipe by means of the fixing means further comprising the two chains 65 and 67 mounted closed around the circumference of the pipe on either side of the portion to be repaired, the operator places the stops 36 and 34 of the positioning tubes on the holes separated by a distance corresponding to the desired maximum repair length. The operator disengages the means for translating the carriage by using the clutch 41 and places the carriage against a first stop 36. The carriage could as well be placed first against the stop 34 without affecting the object of the invention. The operator activates the rotation of the device around the pipe for one complete revolution in order to make a dead turn of the strip around the pipe. He then actuates the clutch 41 in order to engage the means for translating the carriage along its guide rails and in the longitudinal direction of the pipe. The sprockets 35 and 37 then rotate the chain 40 and the carriage is driven by the gear 26 which cooperates with the strand 42 of the chain. At each rotation of 360 degrees of the device around the pipe, the carriage advances in a first direction by a predetermined pitch and preferably equal to half a strip width. The strip is wound in a helix and in an overlapping manner around the pipe to form a first layer until the mobile part 25 of the carriage 20 comes into contact with the stop 36. The mobile part 25 then moves by sliding in the cavity 23 so that the gear 24 moves away from the chain 40 while the gear 26 approaches it until it cooperates with the strand 43 of the chain, the cooperation being maintained thanks to the attraction of the two magnets 45 and 50. The rotation of the device around the pipe continues in a continuous manner and the carriage driven by the strand 43 of the chain advances in the direction opposite to the first one. The strip is wound in a helix and in an overlapping manner around the pipe to form a second layer superimposed on the first layer until the mobile part 25 of the carriage 20 comes into contact with the stop 34 and so on for the subsequent layers.

If it is desired to wind several layers of reinforcing strips around the pipe in the form of a pyramid, each layer must then cover a length of pipe that is less than the overlapping length of the previous layer. This operation is possible thanks to the stops 34 and 36 which can be moved and locked in several positions on the positioning tubes 14 and 16 by means of the indexing fingers 54 and 56. Thus, after each reversal of the direction of movement of the carriage in translation, the stop 34 or 36 from which the carriage moves away is moved one pitch in the direction of the other stop, the distance of one pitch corresponding to the distance between two consecutive holes on the tube. The stop must be moved once the carriage is far enough away and in the direction which reduces the distance between the two stops 34 and 36. The means for sliding and for locking stops 34 and 36 after each passage of the carriage are actuated manually by an operator or automatically without the intervention of an operator, for example by a remote control PLC. Being able to wind the strip in the form of a pyramid around the pipe without removing the winding device, and symmetrically with respect to the repair zone, is a significant advantage of the device according to the invention. Indeed, the winding of a strip in the form of a pyramid allows the pipe to expand under the effect of pressure and temperature and avoids the throttling of the strip around the pipe at the end of the winding area. This way of winding the strip is now part of the ASME PCC-2 and ISO/TS 24.817 standards in terms of the method for repairing pipes, and the device according to the invention therefore makes it possible to comply with these standards.

The last layer of strip can also end with a dead turn of the strip 32 around the circumference of the pipe. The device 10 is then removed from the pipe.

According to an alternative embodiment of the invention not shown in the figures, the clutch 41 is placed on the carriage and makes it possible to disengage the means for translating the carriage by disconnecting the attraction of the magnets 45 and 50 and by placing the mobile part 25 so that none of the gears 24 and 26 cooperate with the chain.

The invention claimed is:

1. A winding device (10) for winding a reinforcing strip onto a repair length on either side of a portion to be repaired (61) of a pipe (60) comprising:
   a carriage (20) rigidly connected to a reel holder (30),
   a reel of reinforcing strip (32) wound onto said reel holder,
   means (65, 15, 67, 17, 12, 13) for rotating said carriage around the circumference of said pipe and means (20, 40, 24, 26, 35, 37) for translating said carriage along the longitudinal axis of said pipe so that said strip is wound around said pipe in the form of a helix,
   means (34, 44, 36, 46) for reversing the direction of the translation movement of said carriage so that, at each change of direction, said carriage moves in a direction opposite to the previous one and a layer of reinforcing strip is wound around said pipe, overlapping the previous layer,
wherein:
   the means for translating said carriage further comprise a conveyor chain (40) comprising two strands (42, 43) moving between a first sprocket (35) and a second sprocket (37) in opposite directions, and mobile means for attachment of the carriage to the chain adapted to cooperate with the strands of the chain;
   and wherein the reversing means move the mobile attachment means of said carriage from one strand (42) to the other strand (43) and vice versa so that, when one of the mobile attachment means becomes detached from one strand, the other mobile attachment means cooperates with the other strand, said reversing means thus being actuated automatically during the rotation of said carriage around said pipe.

2. The device according to claim 1, wherein the mobile attachment means of said carriage are two gears (24,26) fixed on a mobile part (25) sliding in a cavity (23) of said carriage and each capable of cooperating with the strands (42, 43) respectively of said chain (40).

3. The device according to claim 2, wherein said reversing means comprise two stops (34, 36) each equipped with an elastic blade (44, 46) and two positioning tubes (14, 16), respectively, provided with holes (114, 116), said stops (34, 36) each being locked in said holes (114 or 116) of said positioning tubes (14, 16), respectively.

4. The device according to claim 3, wherein said stops (34, 36) are provided with means for sliding along said positioning tubes (14, 16), respectively, and with means for locking at different positions corresponding to one of the holes (114) of said tube (14) or one of the holes (116) of said tube (16), said holes (114, 116) being separated from adjacent holes by an equal pitch.

5. The device according to claim 4, wherein, after each reversal of the direction of movement of said carriage (20), said stop (34 or 36) from which said carriage moves away is moved one pitch in the direction of said other stop (34, 36) so that each layer of reinforcing strip covers a length of pipe less than an overlapping length of the previous layer.

6. The device according to claim 4, wherein said means for sliding and for locking said stops (34, 36) comprise an indexing finger (54, 56) mounted on a spring which, when pulled, allows sliding of said stops along their respective positioning tube (14, 16) and when released and positioned in front of one of said holes (114, 116) locks said stop on said tube (14, 16).

7. The device according to claim 4, wherein said means for sliding and for locking said stops (34, 36) are actuated manually by an operator.

8. The device according to claim 4, wherein said means for sliding and for locking said stops (34, 36) are actuated automatically without the intervention of an operator.

9. The device according to claim 3, wherein said carriage (20) slides in the two directions along guide means parallel to the longitudinal axis of said pipe (60), said carriage being limited in its movement along said guide means by said stops (34 and 36).

10. The device according to claim 9, wherein said mobile part is sized and positioned so that, when said carriage (20) moves along said guide means in the direction of said stop (34), said mobile part (25) comes into contact with said stop (34), said mobile part (25) is pushed by said stop (34) and slides in the cavity (23) so that the gear (26) moves away from the chain strand (42) and is detached from it while said gear (24) approaches said strand (43) of the chain until said gear (24) cooperates with said strand (43), and vice versa when said carriage (20) moves along said guide means in the direction of said stop (36), said mobile part comes into contact with said stop (36), said mobile part 25 is pushed by said stop 36 and slides in the cavity (23) so that said gear (24) moves away from the strand (43) of the chain and is detached from it while said gear (26) approaches said strand (42) of the chain to cooperate with it.

11. The device according to claim 10, wherein, when said gears (24, 26) cooperate with said strands (43, 42), respectively, said mobile part (25) is in a stable position maintained by the attraction of a magnet (45) rigidly connected to the mobile part and a magnet (50) rigidly connected to the carriage.

12. The device according to claim 1, wherein said means for rotating said carriage around said pipe comprise two sprockets (15, 17) each located at two ends of the device and each engaged in a chain (65, 67), respectively, said chains (65 and 67) being closed around the outer circumference of said pipe (60) and placed on either side of the portion to be repaired (61) of said pipe.

13. The device according to claim 12, wherein said means for translating said carriage are connected to at least one of the two sprockets (15 and 17) by a gear system such that the rotational movement of said carriage causes the translation movement of said carriage.

14. The device according to claim 13, wherein the means for translating said carriage (20) can be disengaged by means of a clutch (41).

15. The device according to claim 13, in which said sprockets (15 and 17) are sized so that, at each revolution of the carriage around the pipe, said carriage advances with a regular pitch of length equal to half the width of said strip (32).

16. The device according to claim 1, comprising a set of wheels (18 and 19) located at each of two ends of the device.

17. The device according to claim 1, in which said conveyor chain (40) is a stainless steel roller chain.

18. The device according to claim 1, in which said means for rotating said carriage around said pipe (60) comprise two half-flywheels (12, 13) each located at two ends of the device and actuated by at least one operator.

\* \* \* \* \*